(12) United States Patent
Ma

(10) Patent No.: US 9,093,747 B2
(45) Date of Patent: *Jul. 28, 2015

(54) INSERT TYPE ANTENNA MODULE FOR PORTABLE TERMINAL AND METHOD FOR MANUFACTURING THE SAME

(71) Applicant: Sang-Yong Ma, Ansan-si (KR)

(72) Inventor: Sang-Yong Ma, Ansan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,337

(22) Filed: Apr. 8, 2014

(65) Prior Publication Data

US 2014/0230237 A1  Aug. 21, 2014

Related U.S. Application Data

(63) Continuation of application No. 13/139,031, filed as application No. PCT/KR2009/007454 on Dec. 11, 2009, now Pat. No. 8,760,351.

(30) Foreign Application Priority Data

| Dec. 11, 2008 | (KR) | 10-2008-0125877 |
| Mar. 31, 2009 | (KR) | 10-2009-0027587 |
| Jul. 13, 2009 | (KR) | 10-2009-0063476 |
| Sep. 2, 2009 | (KR) | 10-2009-0082243 |

(51) Int. Cl.

| *H01Q 1/24* | (2006.01) |
| *B29C 45/16* | (2006.01) |
| *H01Q 1/40* | (2006.01) |
| *H01Q 21/28* | (2006.01) |
| *B29L 31/34* | (2006.01) |

(52) U.S. Cl.
CPC ............ *H01Q 1/243* (2013.01); *B29C 45/1671* (2013.01); *H01Q 1/40* (2013.01); *H01Q 21/28* (2013.01); *B29K 2995/0005* (2013.01); *B29L 2031/3437* (2013.01); *B29L 2031/3456* (2013.01); *Y10T 29/49016* (2015.01)

(58) Field of Classification Search
CPC .................. B29C 45/1671; B29K 2995/0005; B29L 2031/3437; B29L 2031/3456; H01Q 1/243; H01Q 1/40; H01Q 21/28; Y10T 29/49016
USPC ................... 343/702, 788, 873, 895, 700 MS
See application file for complete search history.

(56) References Cited

U.S. PATENT DOCUMENTS

| 6,369,777 | B1 * | 4/2002 | Ohara et al. ................... 343/895 |
| 2006/0092082 | A1 * | 5/2006 | Komine ....................... 343/702 |
| 2013/0106662 | A1 * | 5/2013 | Ishida ........................... 343/702 |
| 2013/0113663 | A1 * | 5/2013 | Zhang et al. .................. 343/702 |
| 2014/0132460 | A1 * | 5/2014 | Cho et al. ...................... 343/702 |
| 2014/0228080 | A1 * | 8/2014 | Choi et al. ................. 455/575.1 |

* cited by examiner

*Primary Examiner* — Thien M Le

(74) *Attorney, Agent, or Firm* — Lexyoume IP Meister, PLLC

(57) ABSTRACT

The present invention relates to an antenna module for an insert type antenna module for a portable terminal and a method for manufacturing the same. More specifically, the method for manufacturing an insert type antenna module for a portable terminal comprises an antenna radiation part manufacture step wherein an antenna core is manufactured, the antenna core being engaged by an insert so that an antenna radiation part configured in a predetermined shape selected between a plane shape and a curved shape with at least one axis by cutting and bending a conductive metal sheet is exposed toward an outer surface of one side, wherein in the antenna radiation part manufacture step, in the core forming mold is disposed an antenna support protrusion maintaining a gap for the sake of a thickness development of the antenna core.

16 Claims, 13 Drawing Sheets

Fig. 8
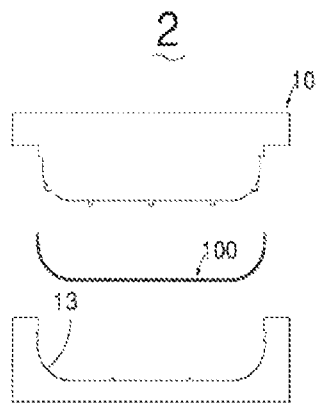
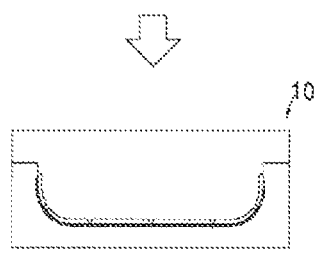
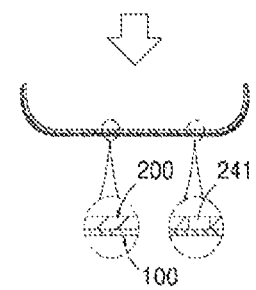

Fig. 12
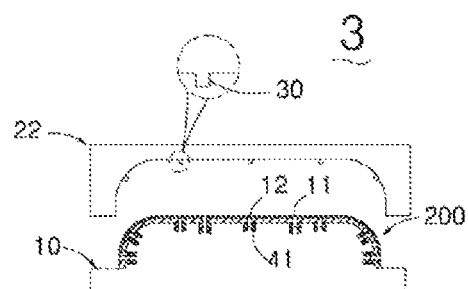
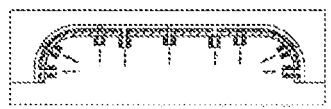
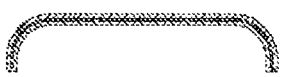
Fig. 13
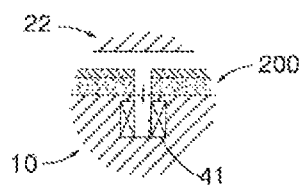

INSERT TYPE ANTENNA MODULE FOR PORTABLE TERMINAL AND METHOD FOR MANUFACTURING THE SAME

CLAIM OF PRIORITY

This application is a Continuation Application of U.S. patent application Ser. No. 13/139,031, which was filed on Jun. 10, 2011, which makes reference to, incorporates the same herein, and claims all benefits accruing under 35 U.S.C. §119 from applications filed in the Korean Intellectual Property Office on 11 Dec. 2008 and there duly assigned Serial No. 10-2008-0125877, on 31 Mar. 2009 and there duly assigned Serial No. 10-2009-0027587, on 13 Jul. 2009 and there duly assigned Serial No. 10-2009-0063476, and on 2 Sep. 2009 and there duly assigned Serial No. 10-2009-0082243. Furthermore, this application makes reference to, incorporates the same herein, and claims all benefits accruing under 35 U.S.C. §365(c) of my PCT International application entitled ANTENNA MODULE FOR PORTABLE TERMINAL HAVING ANTENNA INSERTED THEREIN AND MANUFACTURING PROCESS OF THE ANTENNA MODULE filed on 11 Dec. 2009 and duly assigned Serial No. PCT/KR2009/007454.

BACKGROUND OF THE INVENTION

1. Technical Field

The present invention relates to an insert type antenna module for a portable terminal and a method for manufacturing the same, and in particular to an insert type antenna module for a portable terminal and a method for manufacturing the same which make it possible to enhance the durability of an antenna module in such a way that an antenna radiation part is made of a conductive metal material in a plane form or in a curve form with at least two axes, and an insert is integrally formed on an outer surface of an antenna module, thus increasing the productivity of an antenna module.

2. Background Art

An antenna module, which is generally used for a portable terminal having a wireless communication function like a cellular phone, a PDA, a DMB and a navigation device, uses a road antenna, a helical antenna, and a retractable antenna.

The conventional antenna module is installed at an outer side of a terminal, which leads to a huge volume problem. In order to improve the problem, an antenna built-in in a terminal like a chip antenna, a ceramic antenna, MP12 (Metal plate antenna), an inverted-F antenna and an inverted-L antenna is developed and at present used.

The antenna module built-in in the terminal needs a separate space in the interior of the terminal for installing the antenna module or is directly attached to a terminal housing.

The conventional built-in type antenna module is needed to decrease its weight and volume, while increasing a signal reception performance which is a key function of the antenna, based on the recent trends that most of electronic devices become light and compact-sized.

Korean patent number 2007-0044140 discloses an antenna in which an antenna radiation part formed of a PCB in part or an antenna radiation part formed of an antenna circuit on a film is integrated in a housing module. The above patent, however, has a lot of problems: a PCB pattern is transformed, housing has a limit in making it smaller and thinner, a curve with at least two axes is impossible to form, which leads to a low signal reception and a high defects in products, a manufacture process is complicated, and its manufacture costs high.

Korean patent number 2006-0042663 discloses an antenna in which a radiation part is formed of a sheet metal and is attached to an inner side of a terminal; however an antenna radiation part is exposed and fixedly adhered. In this case, a separate installation space and an engaging member are needed for an antenna radiation member and have a lot of problems: an antenna radiation part is exposed, a pattern might be transformed, a curve with at least two axes is not easy to form, which leads to a low signal reception and a higher defect.

SUMMARY OF THE INVENTION

Disclosure of Invention

Accordingly, it is an object of the present invention to provide an insert type antenna module for a portable terminal and a method for manufacturing the same which overcomes or improves the problems encountered in a conventional antenna built-in type portable terminal: it is impossible to make a cover of a terminal thinner because an antenna is simply attached or built in, a defect ratio is high, a manufacture process is complicated, and a curve with at least two exes is not easy to form.

To achieve the above objects, in a manufacture of an antenna module for a portable terminal, there is provided an insert type antenna module for a portable terminal in which an antenna radiation part has a curve with at least one axis an is formed of a conductive metallic sheet, and an antenna core to which an antenna radiation part is engaged is injection-molded, and a cover is injection-molded on an exposed side of an antenna core in a state that an antenna core is inserted.

Effects

In a manufacture of an antenna module for a portable terminal according to the present invention, a cover is injection-molded at one exposed side of an antenna core in a state that an antenna core to which an antenna radiation member is engaged is inserted, so a thickness of an antenna module is uniform, and a weight, volume and area decrease, which leads to a lightness and a compact size of a terminal housing. A plurality of antenna radiation parts can be integrated in one housing, a manufacture process can be simplified as compared to a conventional antenna (each antenna is separately manufactured and attached), thus improving quality and manufacture process in manufacturing a terminal housing.

The present invention is characterized in that an antenna radiation part is formed of a conductive metal sheet having a curve with at least two axes and an integrated ground terminal, thus improving signal reception efficiency by more than 30%.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 8 is a view of a state that a radiation accommodation groove is formed at a core forming mold according to the present invention;

FIG. 12 is a view of a manufacture procedure using a protrusion ascending and descending part according to the present invention; and FIGS. 13 to 15 are views of examples of a protrusion ascending and descending part according to the present invention.

Figure 1:
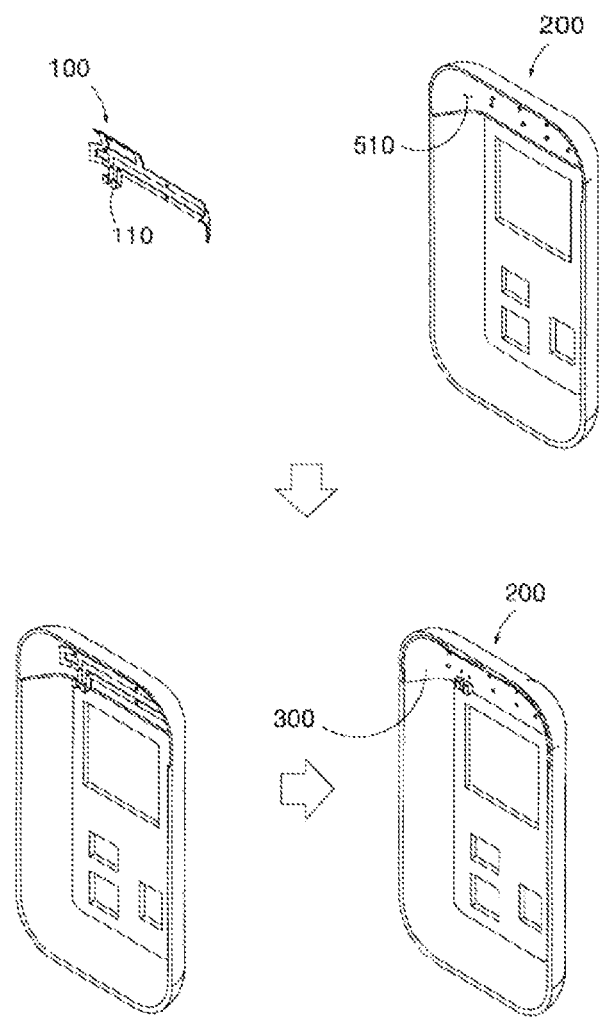
FIG. 1 is a view of a manufacture based on an engagement of an antenna radiation part according to an embodiment of the present invention.

DESCRIPTIONS OF REFERENCE NUMERALS
OF MAJOR ELEMENTS

1: antenna radiation part manufacture procedure
2: antenna core manufacture procedure
3: cover forming procedure
10: core forming mold
10a: core outer side mold
10b: air gap protrusion forming groove
11: antenna engaging protrusion
12: antenna support protrusion
20: cover molding mold
20a: cover outer side mold
30: air gap maintaining protrusion
41: solenoid actuator
42: hydraulic and pneumatic actuator
43: support spring
100: antenna radiation part
110: ground terminal
121: base mold engaging hole
200: antenna core
211: antenna engaging protrusion
221: resin lead prevention shoulder
241: cover mold engaging hole
300: cover
510: antenna module engaging groove

DETAILED DESCRIPTION OF THE INVENTION

Modes for Carrying Out the Invention

The preferred embodiments of the present invention will be described with reference to the accompanying drawings.

The present invention is directed to forming, in a way of insert-injection, an antenna core to which an antenna radiation part is engaged and manufacturing a cover in a way of insert-injection molding, thus improving a productivity and durability.

In a manufacture of an antenna module for a portable terminal according to the present invention, as shown in FIGS. 1 to 7, the method for manufacturing an insert type antenna module for a portable terminal comprises an antenna radiation part manufacture step 1 in which an antenna radiation part 100 is manufactured by cutting and bending a conductive metal sheet for an antenna radiation part to have a plane and a curve with at least one axis; an antenna core manufacture step 2 in which an antenna core 200 is manufactured, which antenna core is engaged by one among an adhering work, an engaging work, a mounting work, an attaching work and an insert work so that the antenna radiation part 100 is exposed from an outer surface of one side; and a cover formation step 3 in which a cover 300 is inject-formed at an exposed surface of the side of the antenna radiation part 100 of the antenna core 200 in a state that the antenna core 200 is inserted in the cover forming mold 20.

Figure 10:
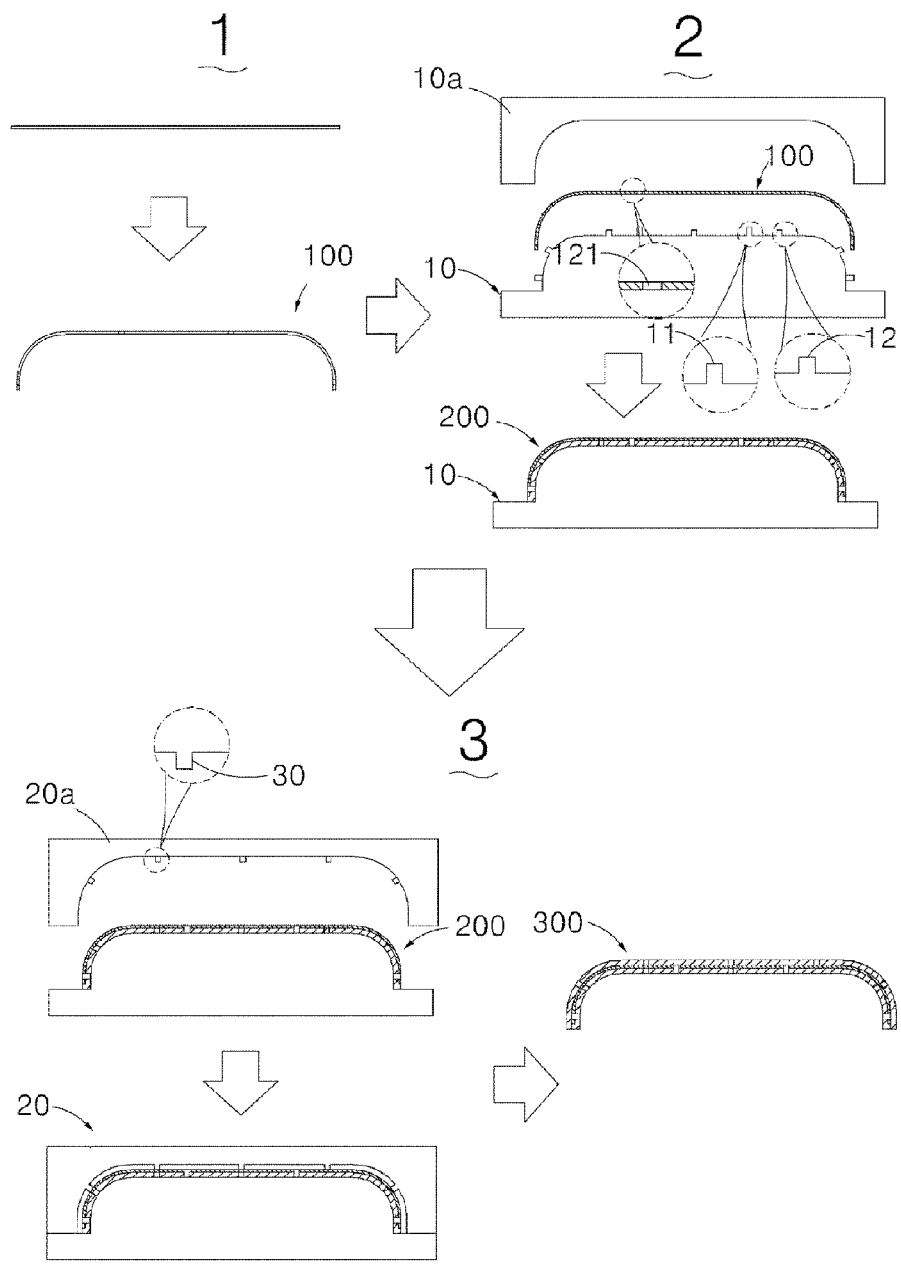
FIG. 10 is a perspective view of a manufacture procedure in which only an outer side mold is exchanged without exchanging an inner side mold according to the present invention.

As shown in FIG. 10, in the cover formation step 3, the antenna module in which the antenna radiation part is inserted is manufactured by exchanging the core outer side mold 10a with the cover outer side mold 20a in a state that the antenna core 200 is not separated from the inner side mold after the antenna core manufacture step 2 is performed.

Figure 2:
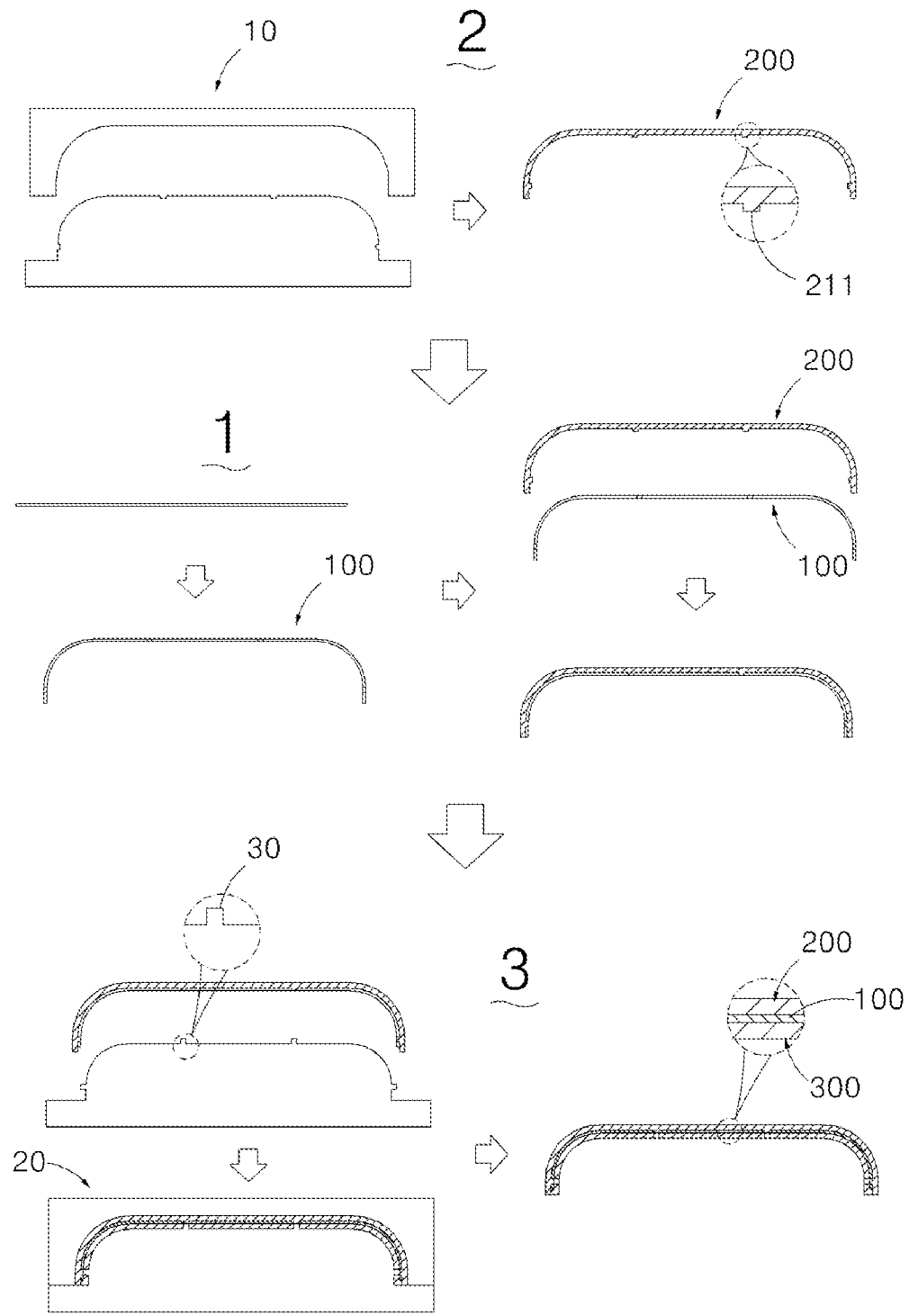
FIG. 2 is a view of a state that an air gap maintaining protrusion is applied to a cover forming mold in the course of a manufacture of FIG. 1.
Figure 3:
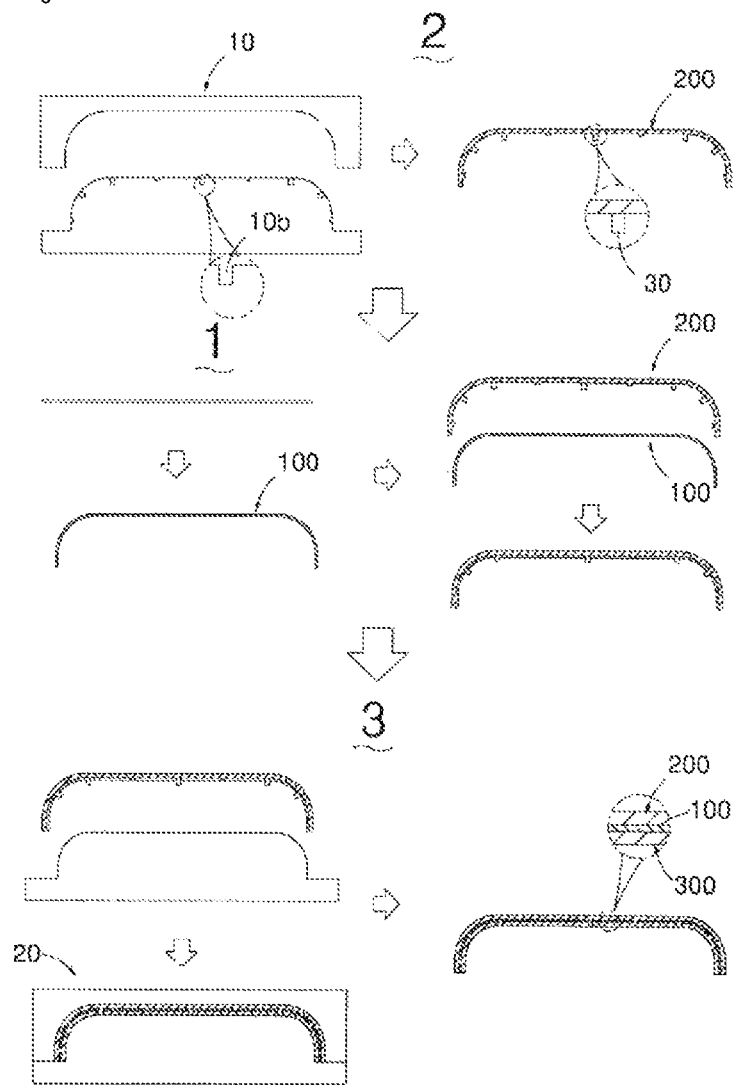
FIG. 3 is a view of a state that an air gap maintaining protrusion is applied to an antenna core in the course of a manufacture of FIG. 1.
Figure 5:
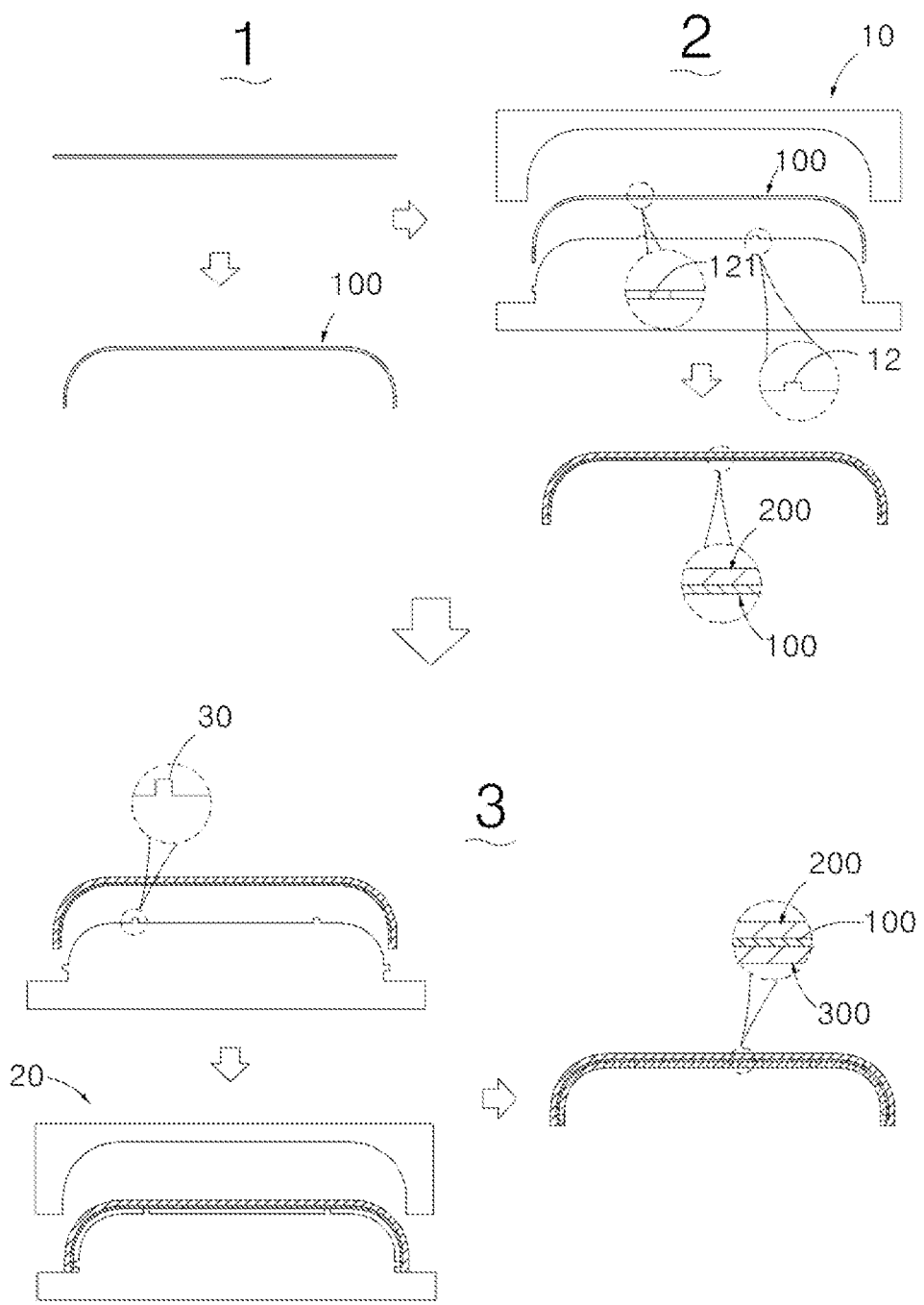
FIG. 5 is a view of a state that an air gap maintaining protrusion is applied to a forming mild in the course of a manufacture of FIG. 4.
Figure 6:
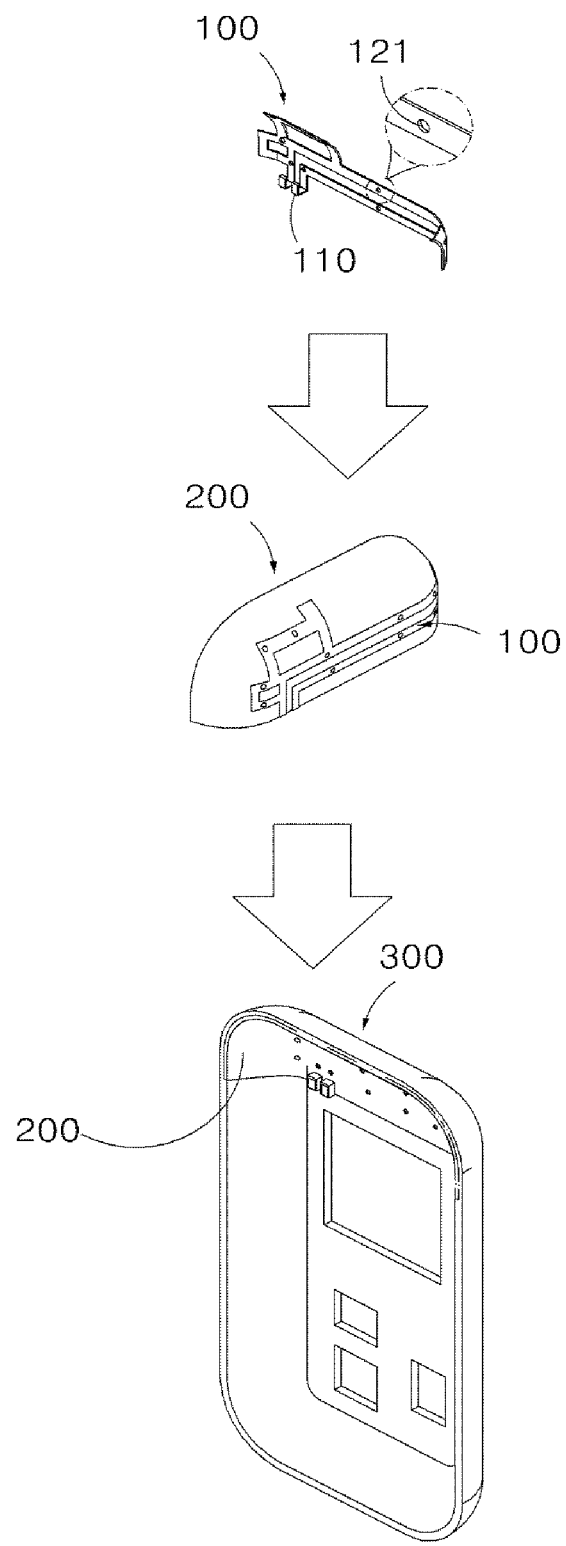
FIG. 6 is a view of a state that a cover is formed of a portable terminal housing according to the embodiments of the present invention.

As shown in FIGS. 2, 3 and 5, the manufacture procedure of the antenna radiation part is characterized in that a conductive metal sheet such as a copper of 0.08~0.15 mm or a stainless or iron is cut to form an antenna pattern, and the cut antenna material is bent multiple times depending on a designed shape, thus forming a curve with a plane or a curve with at least one axis. All kinds of materials which can be processed for cutting and bending using a press machine can be used without having any limits in thickness of a conductive metal sheet.

The ground terminal 110 might be exposed to a side opposed to the side engaged by the antenna radiation part 100 of the antenna core 200 over a right angle bending work performed to have at least two angled portions.

As shown in FIG. 3, the antenna core manufacture procedure 2 is performed in such a way that an air gap protrusion forming groove 10b is formed at the core forming mold 10 to form an air gap maintaining protrusion 30, and a resin is injected, and an antenna core 200 with a thickness less than 0.5 mm is injection-molded, and an antenna engaging protrusion 211 is formed at the antenna core 200 to engage the antenna radiation part 100.

Figure 4:
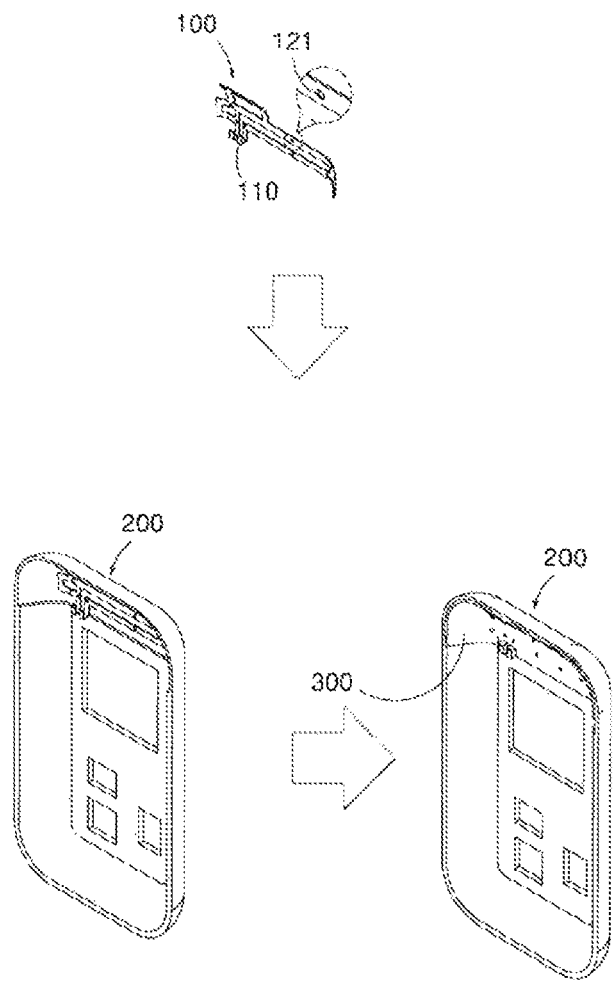
FIG. 4 is a view of a state that an antenna radiation part is inserted into an antenna core according to another embodiment of the present invention.

As shown in FIGS. 4 and 5, according to another embodiment of the antenna core manufacture procedure 2, the antenna radiation part 100 is engaged to the core forming mold 10 to insert-form the antenna radiation part 100, and the air gap protrusion forming grove 10b is formed to form the air gap maintaining protrusion 30, and a resin is injected, thus injection-forming the antenna core with a thickness of less than 0.5 mm.

Figure 7:
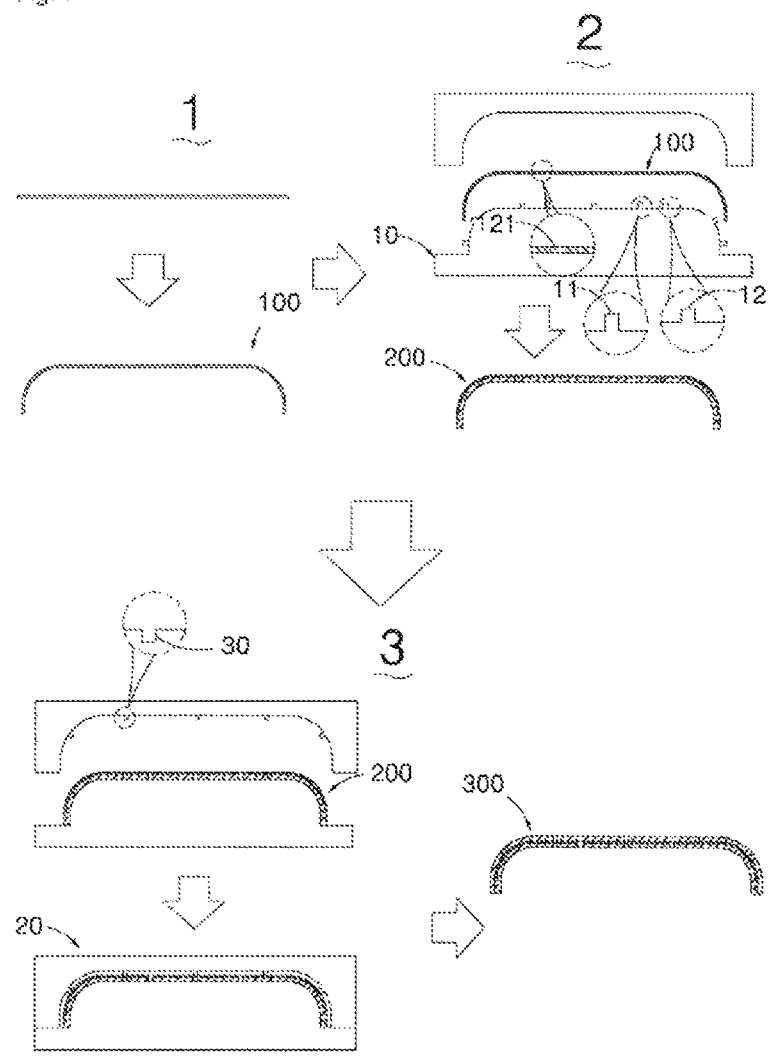
FIG. 7 is a view of a manufacture procedure of FIG. 6.

As shown in FIG. 7, an antenna engaging protrusion 11 might be formed at the core forming mold 10 and is to be engaged by the core mold engaging hole 121 formed at the antenna radiation part 100 in order to prevent the movements of the inserted antenna radiation part 100.

As shown in FIG. 7, the core forming old 10 might include an antenna support protrusion 12 to maintain an air gap from the antenna radiation part 100 to define a thickness of the antenna core 200.

As shown in FIG. 8, the core forming mold 10 might include a radiation part accommodation groove for the inserted antenna radiation part 100 not to move in the course of the injection forming procedure.

Figure 9:
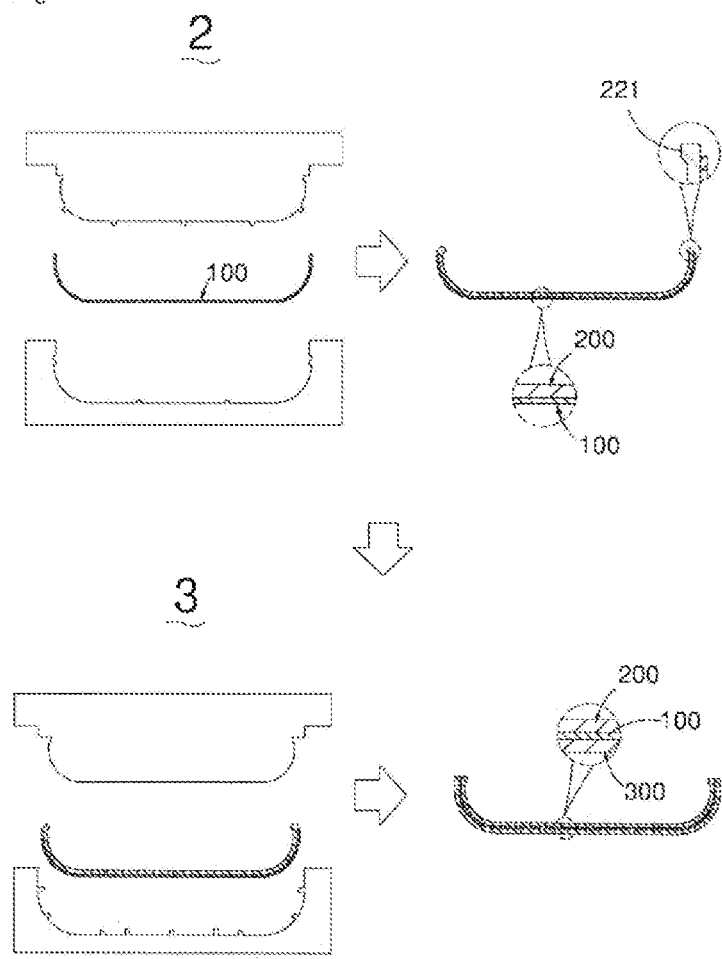
FIG. 9 is a view of a state that a resin leak prevention shoulder is formed at an antenna core according to the present invention.

As shown in FIG. 9, in the course of the antenna core manufacture procedure 2, at an outer rim portion of the antenna core 200 is formed a resin leak prevention shoulder 221 formed to prevent the leak of the resin injected in the course of the injection forming process of the cover 300.

As shown in FIG. 12, a protrusion ascending and descending part might be provided between the antenna radiation part 100 and an inner side mold to help the protrusions be reliably encased after a certain amount of resin is injected, thus preventing the inserted and formed antenna radiation part 100 from being exposed due to the protrusion grooves along with the antenna engaging protrusion 11 and the antenna support protrusion 12 formed at the inner side mold.

As shown in FIGS. 2, 3 and 5, the cover formation procedure 2 is characterized in that the antenna core 200 is insert-engaged so that the antenna radiation part 100 is exposed, and the inserted antenna core 200 is supported by means of a cover air gap maintaining part, and the thickness of the cover 200 is maintained below 0.5 mm, and a resin is injected, thus forming the cover 300.

The cover air gap maintaining part comprises an air gap maintaining protrusion 30 which is protruded from one side of the outer side mold 20a which corresponds to an outer side of the engagement side of the antenna radiation part 100 of the antenna core 200 and an outer side of the engagement side of the antenna radiation part of the antenna core 200 inserted for the injection of the cover 300 and supports the inserted antenna core 200 and maintains a certain thickness of the cover 300 to be formed.

As shown in FIG. 12, the cover forming procedure 3 of the present invention is characterized in that the antenna engaging protrusion 11 provided at the cover inner side mold and the antenna support protrusion 12 and the air gap maintaining protrusion 30, which is the air gap maintaining member of the cover outer side mold 20a, are encased by means of the protrusion ascending and descending part, thus preventing the antenna radiation part from being exposed due to the protrusions.

Figure 11:
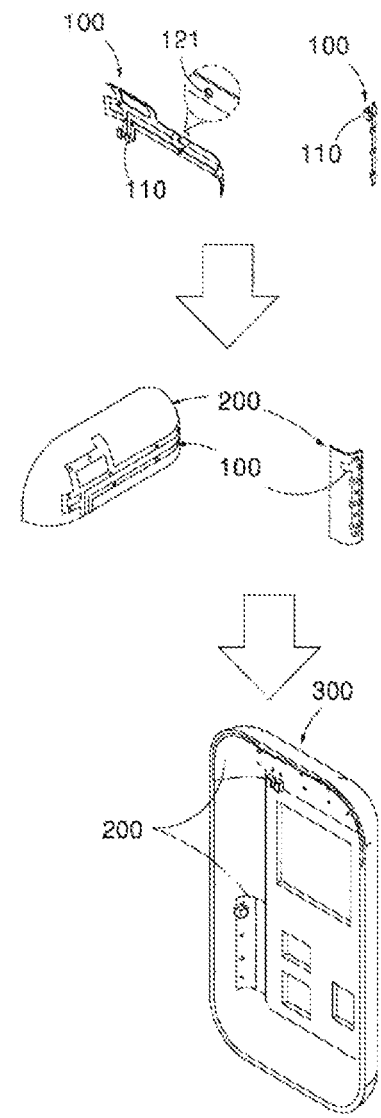
FIG. 11 is a perspective view of a construction that two antenna cores are used according to the present invention.

As shown in FIG. 11, in the course of the cover forming procedure 3 of the present invention, at least two antenna cores 200 with different kinds of engaged antenna radiation parts 100 might be provided. The antenna radiation part 100 might be formed of a GPS antenna, a B/T antenna, etc. along with a main antenna for a wireless communication.

In the embodiments of the present invention, the antenna core 200 might be formed to act the role of the housing of the portable terminal and includes an antenna module accommodation groove 510 which is grooved as deep as the thickness of the cover 300 inject-formed at the exposed surface of the antenna radiation part 100 of the antenna core 200, thus allowing the outer surface not to be protruded after the cover 300 is inject-formed.

The cover 300 might be formed by a housing of the portable terminal.

Figure 14:
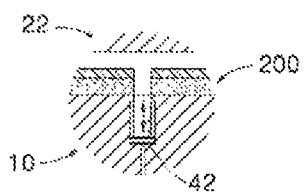
Figure 15:
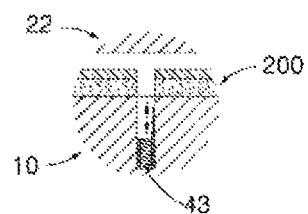

The protrusion ascending and descending part serving to ascend and descend the antenna engaging protrusion 11, the antenna support protrusion 12 and the air gap maintaining protrusion 30 in the courses of the antenna core manufacture process 2 and the cover forming procedure 3 might be formed of the solenoid actuator 41 encasing the protrusion by means of electromagnet of FIG. 13, the hydraulic and pneumatic actuator 42 encasing the protrusion by hydraulic and pneumatic pressure of FIG. 14, or the support spring 43 which supports the protrusions to be encased by a resin pressure of FIG. 15.

The manufacture process of the present invention will be described.

The method for manufacturing an insert type antenna module for a portable terminal comprises an antenna radiation part manufacture step 1 in which an antenna radiation part 100 is manufactured by cutting and bending a conductive metal sheet for an antenna radiation part to have a plane and a curve with at least one axis; an antenna core manufacture step 2 in which an antenna core 200 is manufactured, which antenna core is engaged by one among an adhering work, an engaging work, a mounting work, an attaching work and an insert work so that the antenna radiation part 100 is exposed from an outer surface of one side; and a cover formation step 3 in which a cover 300 is inject-formed at an exposed surface of the side of the antenna radiation part 100 of the antenna core 200 in a state that the antenna core 200 is inserted in the cover forming mold 20. In the above manufacture of the present invention, a conductive metal sheet is cut along a pattern provided based on an antenna design in the course of the antenna radiation part manufacture procedure 1, and an antenna radiation part 100 is processed along a housing shape of a portable terminal having a plane or various curves with at least two axes via a bending procedure.

The antenna core 200 is inject-formed via the antenna core manufacture procedure 2. In the injection mold forming procedure, the antenna core is manufactured by engaging the antenna radiation body 100 by means of one among an adhering work, an engaging work, an attaching work and an insert work so that the antenna radiation part 100 can be exposed from one side surface of the antenna core 200.

A resin is coated on the exposed surface of the antenna radiation part 100 expose and engaged to one side surface of the antenna core 200 via the cover forming procedure 2 by a thickness of less than 0.5 mm, and an insert injection formation is conducted in the cover forming mold 20, thus forming a cover 300, so the antenna module is finished.

In the cover forming procedure 3, the antenna module is manufactured quickly, easily and precisely via the injection forming work of the cover in a state that the core outer side mold 10a is exchanged with the cover outer side mold 20a without separating the antenna core 200 from the inner side mold. The manufacture of the antenna module can be automatically performed with the aid of a rotary injection mold in which the core outer side mold 10a and the cover outer side mold 20a are sequentially engaged as the inner side mold rotates depending on the manufacture procedure.

In the antenna core manufacture procedure 2 and the cover forming procedure 3, the antenna engaging protrusion 11, the antenna support protrusion 12 and the air gap maintaining protrusion 30 might be provided. In the antenna core manufacture procedure 2, the antenna radiation part 100 is engaged at an accurate position, and the antenna core 200 is manufactured, and the thickness of the cover is made uniform by means of the air gap maintaining protrusion 30.

When the antenna engaging protrusion 11, the antenna support protrusion 12 and the air gap maintaining protrusion 30 are constituted to be encased by means of the encasing ascending and descending part, it is possible to prevent the exposures of the grooves and the antenna radiation part 100 due to various protrusions in the antenna core manufacture procedure 2 and the cover forming procedure 3.

INDUSTRIAL APPLICABILITY

The present invention is characterized in that in a manufacture of an antenna module for a mobile terminal, a cover is inject-formed at an outer surface of the exposed side of an antenna core in a state that an antenna core to which an antenna radiation part is engaged is inserted, which results in manufacturing a uniform thickness of an antenna module and decreasing a weight, volume and area, thus achieving a lighter and thinner terminal housing. Since a plurality of radiation parts can be integrated in one housing, a manufacture process can be more simplified as compared to a conventional antenna manufacture method (each antenna is manufactured and attached), thus obtaining an excellent quality and cost-effective product in a terminal housing manufacture process.

The present invention is characterized in that an antenna radiation part is formed of a conductive metal sheet which has a curve with at least two axes and an integral ground terminal, thus enhancing signal reception efficiency by more than 30%.

After the antenna core is inject-formed, it is not separated. Instead the core outer side mold is exchanged with a cover outer side mold, thus manufacturing the antenna module. In the curse of the manufacture, a transformation of the antenna core can be prevented, and a manufacture process is simplified, thus enhancing productivity.

There are provided the antenna engaging protrusion, the antenna support protrusion and the air gap maintaining protrusions, so the thicknesses of the antenna core and the cover are uniform and the antenna radiation part can be insert-formed at an accurate position, thus enhancing the quality in manufacture.

The antenna engaging protrusion, the antenna support protrusion and the air gap maintaining protrusions are all encased and operate by means of the encasing ascending and descending part, the exposures of the groove and the antenna radiation part due to the protrusions in the course of the antenna core manufacture and the cover formation are prevented, thus making the antenna module look nice.

At least two antenna cores are provided, so various kinds of antennas can be integrated in the housing of the portable terminal along with the enhanced functions.

What is claimed is:

1. A method for manufacturing an insert type antenna module for a portable terminal, comprising:
   an antenna radiation part manufacture step 1 in which an antenna radiation part is manufactured by cutting and bending a conductive metal sheet for an antenna radiation part to have a plane and a curve with at least one axis;
   an antenna radiation part manufacture step 2 wherein an antenna core is manufactured, the antenna core being engaged by an insert so that an antenna radiation part manufactured by the antenna radiation part manufacture step 1 is exposed toward an outer surface of one side, wherein in the antenna radiation part manufacture step 2, in the core forming mold is disposed an antenna support protrusion maintaining a gap for the sake of a thickness development of the antenna core.

2. The method of claim 1, further comprising a cover formation step 3 in which a cover is inject-formed at an exposed surface of the side of the antenna radiation part of the antenna core in a state that the antenna core is inserted in the cover forming mold.

3. The method of claim 2, wherein in said cover formation step 3, the antenna module in which the antenna radiation part is inserted is manufactured by exchanging the core outer side mold with the cover outer side mold in a state that the antenna core is not separated from the inner side mold after the antenna core manufacture step 2 is performed.

4. The method of claim 2, wherein in said cover formation step 3, the antenna core is insert-engaged so that the antenna radiation part can be exposed, and the inserted antenna core is supported by means of a cover air gap maintaining means, and the thickness of the cover is less than 0.5 mm, and then resin is injected, thus forming a cover, and said cover air gap maintaining means comprises an air gap maintaining protrusion which is protruded from one side of the outer side mold which corresponds to an outer side of the engagement side of the antenna radiation part of the antenna core and an outer side of the engagement side of the antenna radiation part of the antenna core inserted for the injection of the cover and supports the inserted antenna core and maintains a certain thickness of the cover to be formed.

5. The method of claim 2, wherein in said antenna radiation manufacture step 1, the conductive metal sheet is cut along an antenna pattern, and the cut antenna material is processed to have a plane or a curved surface of at least one axis depending on a design configuration, and one side of the antenna radiation part is bent at a right angle in at least two tiers, for thereby forming an integrated ground terminal.

6. The method of claim 1, wherein in said antenna core manufacture step 2, the antenna radiation part is engaged to the core forming mold so that the antenna radiation part can be insert-formed in the course of the injection forming step, and the air gap protrusion forming groove is formed for a formation of the air gap maintaining protrusion, and a resin is injected, thus injecting the antenna core, and the core forming mold comprises at least one between an antenna engaging protrusion which is engaged to the core mold engaging hole formed at the antenna radiation part in order to prevent the movements of the inserted antenna radiation part, and a radiation part accommodation groove for preventing movements of the inserted antenna radiation part in the course of the injection forming step.

7. The method of claim 1, wherein in said antenna core manufacture step 2, a resin leak prevention shoulder is formed at an outer rim portion of the antenna core in order to prevent the resin injected in the course of the injection formation of the cover from being leaked toward the lower side surface of the antenna core.

8. The method of claim 2, wherein in said cover formation step 3, at least two antenna cores with different kinds of antenna radiation parts are provided.

9. The method of claim 1, wherein said antenna core is formed to act the role of the housing of the portable terminal and includes an antenna module accommodation groove which is grooved as deep as the thickness of the cover inject-formed at one side of the antenna core, thus allowing the outer surface not to be protruded after the cover is inject-formed.

10. The method of claim 2, wherein said cover belongs to the housing of the portable terminal.

11. The method of claim 4, wherein in said antenna core manufacture step 2, a protrusion ascending and descending means is provided to encase the antenna engaging protrusion of the inner side mold and the antenna support protrusion after a certain amount of resin is injected into between the antenna core and the inner side mold, and said protrusion ascending and descending means comprises the solenoid actuator encasing the protrusions by means of electromagnet, the hydraulic and pneumatic actuator encasing the protrusions by hydraulic and pneumatic pressure, or the support spring which supports the protrusions to be encased by a resin pressure.

12. The method of claim 4, wherein in said cover formation step 3, the antenna engaging protrusion and the antenna support protrusion provided in the cover inner side mold are encased by means of the protrusion ascending and descending means, so the antenna radiation part is not exposed by means of the protrusions, and said protrusion ascending and descending means comprises the solenoid actuator encasing the protrusions by means of electromagnet, the hydraulic and pneumatic actuator encasing the protrusions by hydraulic and pneumatic pressure, or the support spring which supports the protrusions to be encased by a resin pressure.

13. The method of claim 4, wherein a protrusion ascending and descending means is provided to help the air gap maintaining protrusion, which is an air gap maintaining means of the outer surface mold, to be encased after a certain amount of resin is injected into between the antenna core and the cover outer side mold, and said protrusion ascending and descending means comprises the solenoid actuator encasing the protrusions by means of electromagnet, the hydraulic and pneumatic actuator encasing the protrusions by hydraulic and pneumatic pressure, or the support spring which supports the protrusions to be encased by a resin pressure.

14. The method of claim 1, wherein an antenna radiation part formed of a conductive metal material and having a plane or a curve with at least one axis is engaged to an antenna core, which is inject-formed, by means of an insert work, and the antenna core is inserted, so a cover is formed at an outer surface to which the antenna radiation part of the antenna core is engaged.

15. The method of claim 14, wherein either the antenna core or the cover is formed by a housing of the portable terminal.

16. The method of claim 14, wherein at least two antenna cores with different kinds of antenna radiation parts are provided.

* * * * *